United States Patent
Kim et al.

(10) Patent No.: US 7,502,419 B2
(45) Date of Patent: Mar. 10, 2009

(54) METHOD OF CONTROLLING DATA MODULATION AND CODING APPLIED TO MULTI-INPUT/MULTI-OUTPUT SYSTEM IN MOBILE COMMUNICATIONS

(75) Inventors: Bong Hoc Kim, Anyang-shi (KR); Dongyoun Seo, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 677 days.

(21) Appl. No.: 10/948,686

(22) Filed: Sep. 24, 2004

(65) Prior Publication Data
US 2005/0074072 A1    Apr. 7, 2005

(30) Foreign Application Priority Data
Oct. 1, 2003    (KR) .................. 10-2003-0068306

(51) Int. Cl.
*H04L 1/02* (2006.01)
(52) U.S. Cl. .................. 375/267; 375/259; 455/132; 455/504
(58) Field of Classification Search ............... 375/267, 375/259; 455/132, 504
See application file for complete search history.

(56) References Cited

U.S. PATENT DOCUMENTS

| | | | | |
|---|---|---|---|---|
| 6,956,907 | B2* | 10/2005 | Ketchum | 375/267 |
| 7,072,413 | B2* | 7/2006 | Walton et al. | 375/267 |
| 2002/0094834 | A1* | 7/2002 | Baker et al. | 455/522 |
| 2003/0013468 | A1* | 1/2003 | Khatri | 455/501 |
| 2004/0125900 | A1* | 7/2004 | Liu et al. | 375/347 |

FOREIGN PATENT DOCUMENTS

| WO | WO02/091657 | 11/2002 |
|---|---|---|
| WO | WO02/093784 | 11/2002 |

* cited by examiner

*Primary Examiner*—Shuwang Liu
*Assistant Examiner*—Michael R Neff
(74) *Attorney, Agent, or Firm*—KED & Associates, LLP

(57) ABSTRACT

A novel method of communicating in a Multi-Input/Multi-Output communication system. The method includes receiving channel status information corresponding to each transmitting data stream in the MIMO system, and determining a common modulation scheme to use for all of the transmitting data streams based on the received channel status information. A common coding scheme, common modulation scheme, or a common modulation and coding set may also be selected based on the received channel status information.

4 Claims, 3 Drawing Sheets

METHOD OF CONTROLLING DATA MODULATION AND CODING APPLIED TO MULTI-INPUT/MULTI-OUTPUT SYSTEM IN MOBILE COMMUNICATIONS

CROSS-REFERENCE TO RELATED APPLICATIONS

This application claims the benefit of the Korean Application No. P2003-68306 filed on Oct. 1, 2003, which is hereby incorporated by reference in its entirety. The present invention is also related to U.S. applications Ser. No. 10/834,210, filed on Apr. 29, 2004, Ser. No. 10/845,086, filed on May 14, 2004, Ser. No. 10/939,965, filed on Sep. 14, 2004, and Ser. No. 10/946,342, filed on Sep. 22, 2004, all of which are hereby incorporated in their entirety.

BACKGROUND OF THE INVENTION

1. Field of the Invention

The present invention relates to a method of selecting a common data modulation and coding set (MCS) for multiple streams in a Multi-Input/Multi-Output (MIMO) system.

2. Background of the Related Art

A current High-Speed Downlink Packet Access (HSDPA) system uses a single data stream in transmitting antennas to transmit data to a User Equipment (UE). See, for example, JUHUA KORHONEN, INTRODUCTION TO 3G MOBILE COMMUNICATIONS SYSTEMS ($2^{nd}$ ed. 2003), the entire contents of which are hereby incorporated by reference in its entirety. In the above-described telecommunication system, a base station is referred to as a Node B, and a mobile terminal, subscriber unit, etc. is referred to as a User Equipment (UE).

In the current HSDPA system, a modulation and coding set (MCS) is fixed for the single data stream and the data is transmitted via transmit antennas based on the fixed MCS. One example of a Modulation and Coding Set is QPSK modulation and turbo coding of ½. However, an evolutionary telecommunication system will likely implement the use of multiple transmitting antennas and multiple receiving antennas (e.g., a MIMO system). In a MIMO system, a separate MCS may be selected for each transmitting data stream. However, the standards for selecting the MCS have not as yet been implemented.

SUMMARY OF THE INVENTION

Accordingly, one object of the present invention is to address at least the above-noted and other problems.

Another object of the present invention is to define the standards for selecting a MCS for multiple data streams in the MIMO system.

Yet another object of the present invention is select a MCS that reduces a signaling load requirement.

To achieve these objects and other advantages and in accordance with the purpose of the invention, as embodied and broadly described herein, the present invention provides a novel method of communicating in a Multi-Input/Multi-Output communication system. The method includes receiving channel status information corresponding to each transmitting data stream in the MIMO system, and determining a common modulation scheme to use for all of the transmitting data streams based on the received channel status information. A common coding scheme, common modulation scheme, or a common modulation and coding set may also be selected based on the received channel status information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The invention will be described in detail with reference to the following drawings in which like reference numerals refer to like elements, wherein.

BEST MODE OF THE INVENTION

Figure 1:
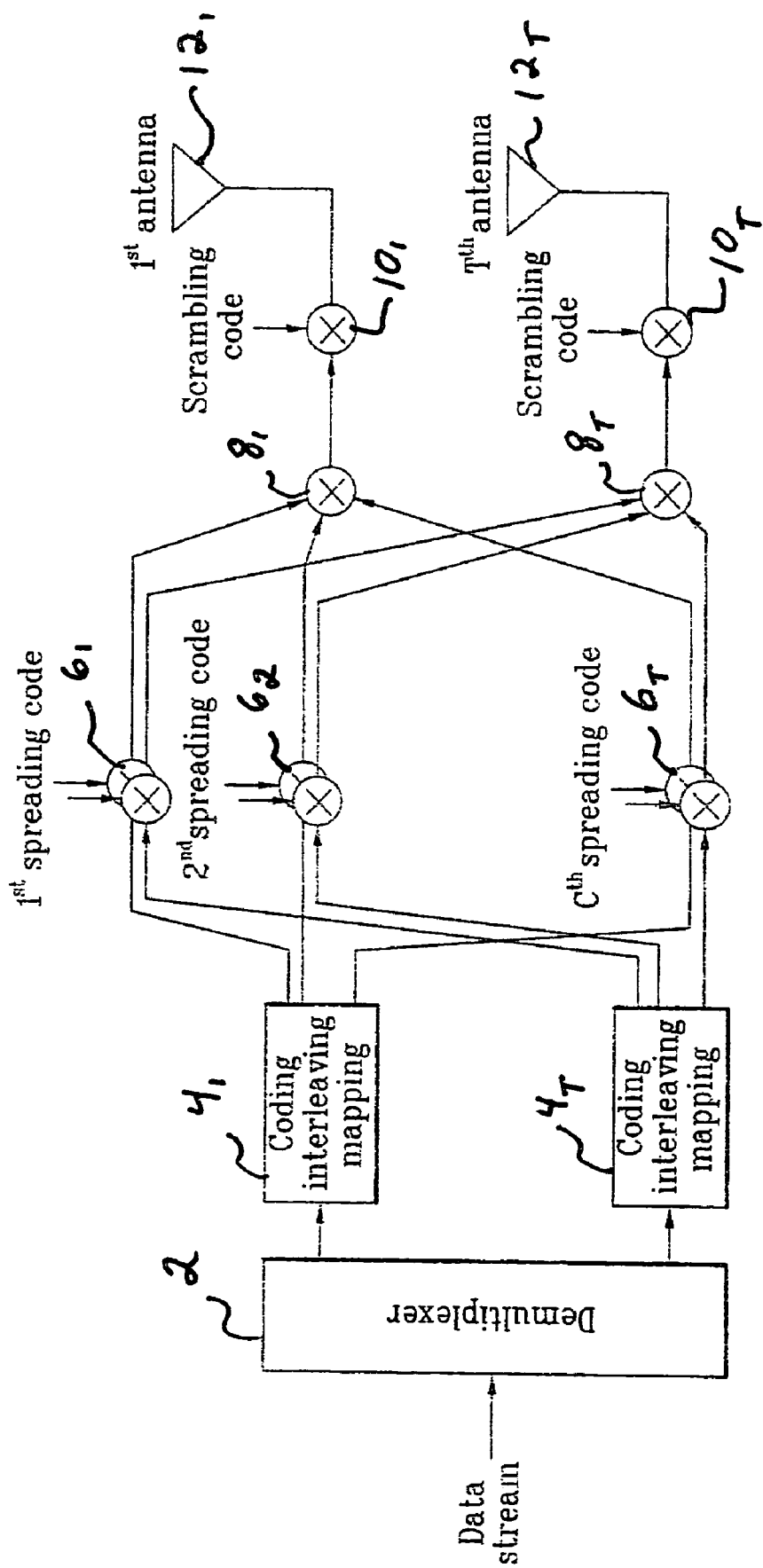
FIG. 1 is an overview of a transmitting end of a V-BLAST system used to explain the selection of MCSs according to different examples of the present invention.

Referring now to the drawings, wherein like reference numerals designate identical or corresponding parts throughout the several views, the present invention will be described.

Figure 2:
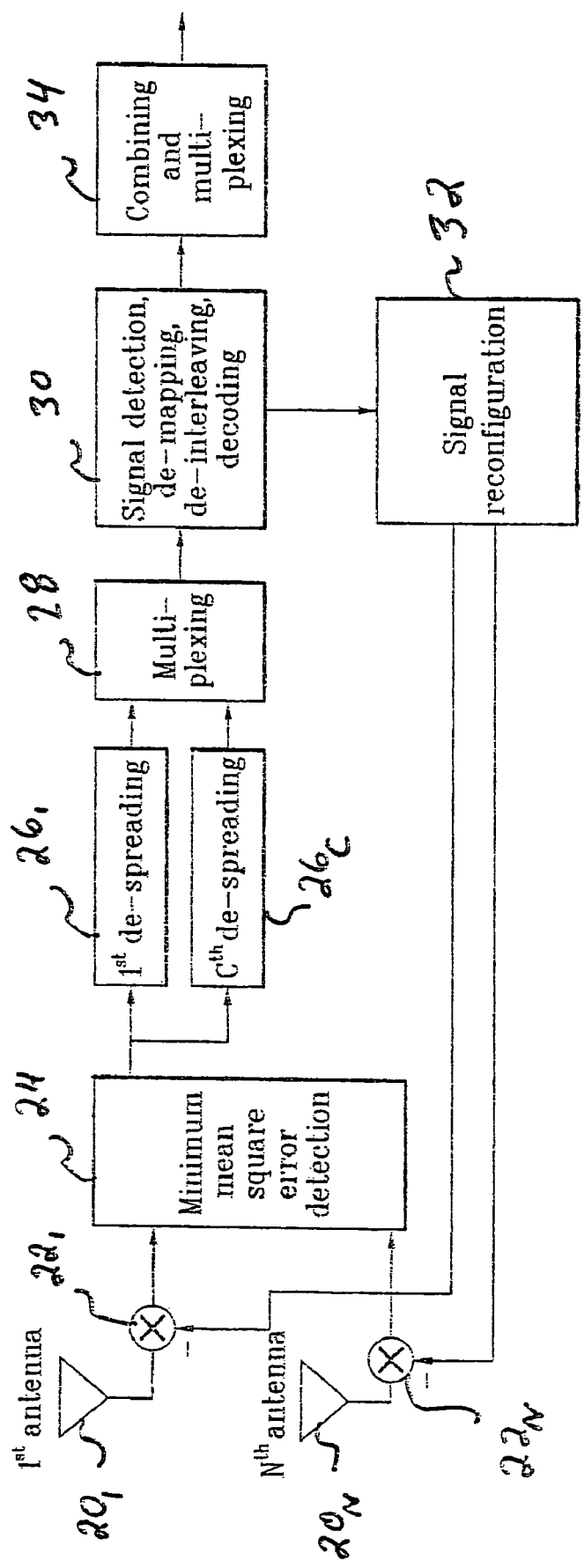
FIG. 2 is an overview of a receiving end of the V-BLAST system.

One example of a MIMO system is shown in FIGS. 1 and 2, and is referred to as a V-BLAST (Vertical Bell Laboratories Layered Space Time) system. In more detail, MIMO wireless communication systems use multiple-element antenna arrays to increase a user capacity in rich scattering environments by exploiting the spatial properties of the channel. One such system is the V-BLAST system, which uses a vertically layered space-time architecture as opposed to the diagonally layered space-time architecture of a D-BLAST system. The V-BLAST system is described in "V-BLAST: An Architecture for Realizing Very High Data Rates Over the Rich-Scattering Wireless Channel" (ISSSE '98, October 1998) by P. W. Wolniansky, G. J. Foschini, G. D. Golden, and R. A. Valenzuela and in "Detection algorithm and initial laboratory results using V-BLAST space-time communication architecture" (IEEE, Vol. 35, No. 1, January 1999) by the same authors, both of which are incorporated by reference.

In the above-described V-BLAST system, the ability to separate the transmitted and received data substreams depends on the slight differences in how the different substreams propagate through the environment. Hence, the V-BLAST system relies on the independence of the divided substreams launched via the plurality of transmitter antennas.

In more detail, FIG. 1 illustrates a transmitting side of the V-Blast System and FIG. 2 illustrates a receiving side of the V-Blast system. A description of the operation of the V-Blast system will first be provided followed by a description of selecting a MCS for the transmitting antennas according to different examples of the present invention.

As shown in FIG. 1, the transmitting side of the V-Blast system includes a demultiplexer 2, a coding, interleaving and mapping unit 4, a spreading unit 6, a symbol combining unit 8, a scrambling unit 10 and transmitting antennas 12. In the MIMO system, a separate MCS may be selected for each different data stream. An example of an operation of the transmitting side will now be given.

Assume, for example, that a data stream input to the demultipexer 2 includes 9600 bits. The demultiplexer 2 then segments the input data stream into two data blocks including 4800 bits each, for example (assuming two transmitting antennas). The two 4800 data bits are then processed by the coding, interleaving and mapping unit 4. In more detail, each of the 4800 bits is coded based on the coding scheme for that particular antenna (assume a turbo coding of ½ is used for the first antenna $12_1$ and a turbo coding of ⅓ is used for the T-th antenna $12_T$). Thus, is in this example, the first 4800 bits would be coded into 9600 bits (i.e., a turbo coding of ½) and the T-th 4800 bits would be coded into 14400 bits (i.e., a turbo coding of ⅓). The two coded blocks of data are then stored into an interleaver for mapping. Assume Quadrature Amplitude Modulation (QAM) is used for the first antenna $12_1$ and Quadrature Phase Shift Keying (QPSK) is used for the T-th antenna $12_T$. Then, the first 9600 coded bits will be mapped into 2400 symbols (i.e., QAM maps 4 bits to one symbol and thus 9600 coded bits will be mapped into 2400 symbols). The T-th 14400 bits will be mapped into 7200 symbols (i.e., QPSK maps 2 bits into one symbol and thus 14400 coded bits will be mapped into 7200 symbols). The two separate coded and modulated data blocks are then processed by the spreading unit 6.

The spreading unit 6 uses a variety of spreading codes such as OVSF (Orthogonal Variable Spreading Factor) codes to spread the data blocks so as to discriminate between different channels of each antenna. Note the receiving side shown in FIG. 2 of the MIMO system has the same spreading codes and despreads the received data using the same codes. Thus, the MIMO system is able to select a different MCS for each respective antenna to thereby increase the throughput of the system.

The spread symbols are then combined in the symbol combining unit 8 and scrambled in the scrambling unit 10 prior to being transmitted from the respective antennas $12_1$ and $12_T$. Note the scrambling codes are used to discriminate cell regions (e.g., the received information is being received from Node B 1 rather than Node B 2, for example).

The receiving operation reverses the transmitting operation to finally obtain the initially transmitted data. In more detail, with reference to FIG. 2, the receiving side includes receiving antennas 20, interference removing unit 22, a Minimum Mean Square Error (MMSE) detector, despreaders 26, a multiplexer 28, a signal detection, de-mapping, de-interleaving and de-coding unit 30, a signal reconfiguration unit 32 and combining and multiplexing unit 34.

Further, the MMSE detector 24 of the receiving end detects a signal having the greatest SINR (Signal-to-Interference Noise Ratio) among signals received through the plurality of reception antennas ($20_1 \sim 20_N$) and performs an MMSE equalization on the signal. Outputs of the MMSE detector 24 are despread in the despreaders 26 and then combined to one signal. The signal detection unit 30 detects a transmission symbol from a signal outputted from the multiplexer 28 and performs de-mapping and de-interleaving operations on the detected symbol to detect a first sub-stream.

At this time, the signal reconfiguration unit 32 reconstructs the first sub-stream detected by the signal detecting unit 30 into a receiving signal form and outputs it to the interference removing unit 22. To minimize influence between symbols, the interference removing unit 22 deletes a first detected signal component (reconstructed signal) from the receiving signal previously stored in the buffer and then the signal component-detected signal to the MMSE detector 24.

Then, the MMSE detector 24 equalizes the signal having the greatest SINR among the reconstructed signal-removed signals. An output of the MMSE detector 24 is inputted to the signal detection unit 30 through the despreaders 26 and the multiplexer 28, and the signal detection unit 30 detects a second sub-stream.

The signal reconfiguration unit 32 reconstructs the second sub-stream which has been detected by the signal detection unit 30 and outputs it to the interference removing unit 22. Then, the interference removing unit 22 deletes the reconstructed signal from a signal previously stored in the buffer and outputs it to the MMSE detector 24.

Thereafter, by repeatedly performing the above-described operations, the signal detection unit 30 sequentially detects sub-streams. After all the sub-streams are detected by the signal detection unit 30, the combining unit 34 assembles the plurality of detected sub-streams to form one data stream.

Thus, in summary, the V-BLAST system performs communications using M-transmitting antennas and N-receiving antennas. In doing so, the sequentially generated data essentially passes through a serial-parallel converting circuit to be transmitted as separate signals in parallel via the respective antennas. In addition, as noted above, the modulation and coding scheme (MCS) of the signal transmitted can be individually set for each antenna.

Further, individually selecting the MCS increases the throughput of the MIMO system. However, the receiving side must send signaling channel information to the transmitting side (such as Channel Quality Indicators (CQIs) indicating a quality of a channel). For example, if the MCS of four antennas are individually controlled, there is four times as much channel status information (such as CQIs) as compared to a single antenna using a single code. Thus, an extra signaling load is added to the MIMO system.

Accordingly, the present invention sets a MCS to be the same for each antenna, even though it is possible to individually select a different MCS for each antenna. In more detail, upon receiving channel status information (hereinafter referred to as CQIs) from the receiving side, the transmitting side selects an appropriate MCS based on the received CQI information.

Figure 3:
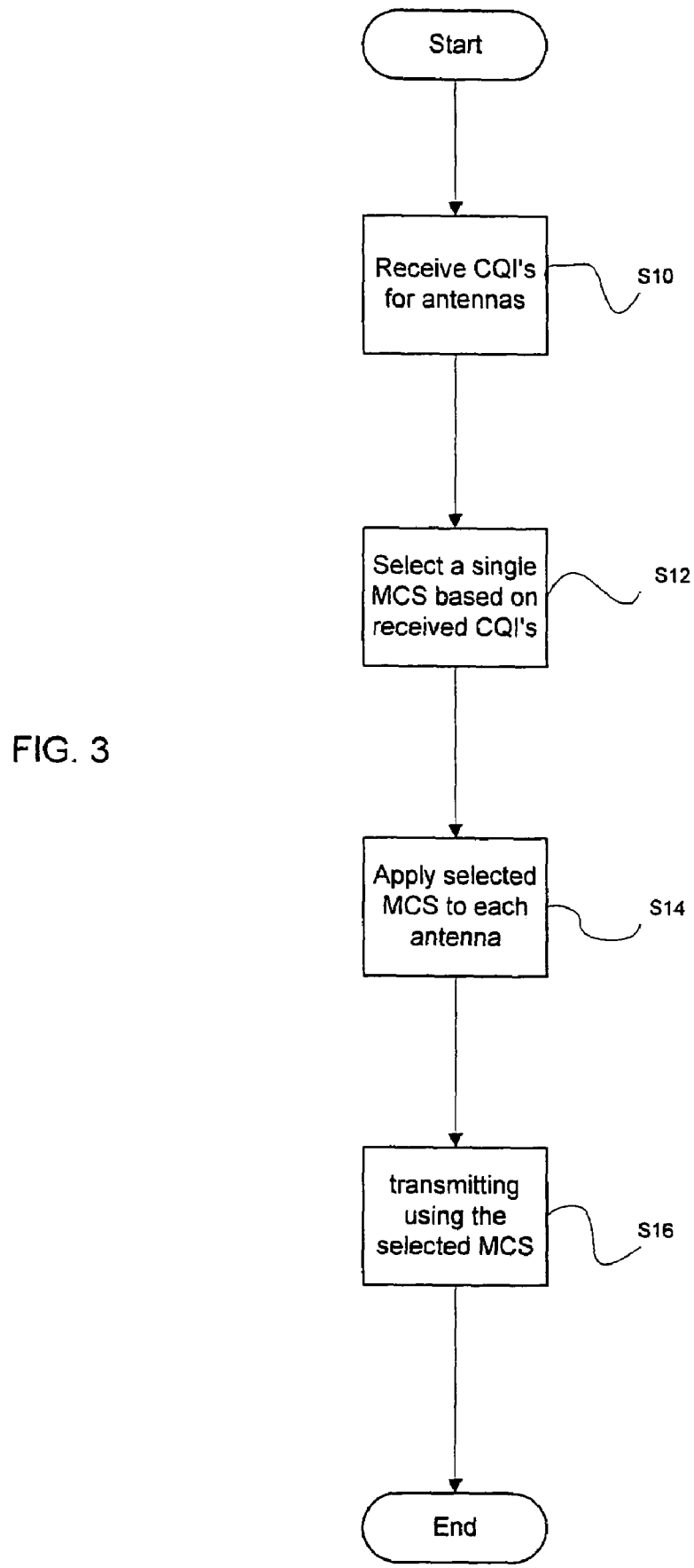
FIG. 3 is a flow chart illustrating a method of selecting a common MCS according to the present invention.

That is, as shown in FIG. 3, the CQIs corresponding to each data stream in a MIMO system are received (step S10), an appropriate MCS is selected based on the received CQIs (step S12), the selected MCS is applied to all of the transmitting data streams in the MIMO system (step S14), and the antennas transmit data using the same applied MCSs (step S16).

For example, assuming there are four transmitting antennas, then there would be four separate CQIs from the receiving side for each of the transmitting data streams. Thus, according to the present invention, the transmitting side selects an appropriate MCS based on the received CQIs. In one example, the transmitting side selects the MCS that allows for the greatest amount of data to be transmitted and applies the selected MCS to each of the four data streams in this example. For instance, if the CQIs for the four transmitting antennas were 3 bits/sec, 2 bits/sec, 0.5 bit/sec, and 1 bit/sec, respectively, the transmitting side applies the MCS used that produced the CQI of 3 bits/sec to all four of the antennas (i.e., in this example the first antenna produced the CQI of 3 bits/sec) so the MCS used for the first antenna will be applied to all four of the antennas.

Note, however, that the present invention may also select an MCS that produces a minimum CQI, an average of the received CQIs, a mean CQI or any other combination. For example, an average of the above CQIs is 1.65 bits/sec. In this example, the MCS that produces this average value is selected and applied to all antennas. This may be performed by reading a CQI data table, for example, and retrieving the corresponding MCS that produced the noted CQI of 1.65 bits/sec. In addition, if the CQI table does not include the exact CQI calculated (such as a CQI of 1.65 bits/sec in this example), a MCS may be selected that is closest to the CQI of 1.65 bits/sec.

In summary, the present invention applies the same MCS to all of the data streams, thereby reducing signaling overhead transmitted from the receiving side and also enabling more power to be allocated to data transmission so as to enhance transmission efficiency.

Note, the above examples describe selecting a common MCS to be used by each transmitting antenna. However, it is also possible to select only a single modulation scheme (rather than selecting both the modulation and coding schemes in the MCS) or to select only a single coding scheme (rather than selecting both the modulation and coding schemes in the MCS) to be applied to each transmitting antenna.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software are. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of communicating in a Multi-Input/Multi-Output (MIMO) communication system having M transmission antennas at a transmitting side, comprising:

receiving, at the transmitting side, a plurality of channel status information corresponding to M transmission data streams in the MIMO system;

determining a common modulation scheme to use for all of the M transmission data streams based on the plurality of channel status information at the transmitting side of the MIMO communication system, wherein determining the common modulation scheme calculates an average value of the plurality of channel status information, and selects the modulation scheme that produces the calculated average value to use as the common modulation scheme;

modulating all of the M transmission data streams using the determined common modulation scheme at the transmitting side of the MIMO communication system; and transmitting all of the M transmission data streams via the M transmission antennas to a receiving side of the MIMO communication system, wherein each of the M data streams corresponds to each of the M transmission antennas, respectively.

2. A method of communicating in a Multi-Input/Multi-Output (MIMO) communication system having M transmission antennas at a transmitting side, comprising:

receiving, at the transmitting side, a plurality of channel status information corresponding to M transmission data streams in the MIMO system;

determining a common coding scheme to use for all of the M transmission data streams based on the plurality of channel status information at the transmitting side of the MIMO communication system, wherein determining the common coding scheme calculates an average value of the plurality of channel status information, and selects the modulation scheme that produces the calculated average value to use as the common coding scheme;

coding all of the M transmission data streams using the determined common coding scheme at the transmitting side of the MIMO communication system; and transmitting all of the M transmission data streams via the M transmission antennas to a receiving side of the MIMO communication system, wherein each of the M data streams corresponds to each of the M transmission antennas, respectively.

3. A method of communicating in a Multi-Input/Multi-Output (MIMO) communication system having M transmission antennas at a transmitting side, comprising:

receiving, at the transmitting side, a plurality of channel status information corresponding to M transmission data streams in the MIMO system; and determining a common modulation and coding set to use for all of the M transmission data streams based on the plurality of channel status information at the transmitting side of the MIMO communication system, wherein determining the common modulation and coding set calculates an average value of the plurality of channel status information, and selects the modulation and coding set that produces the calculated average value to use as the common modulation and coding set;

modulating and coding all of the M transmission data streams using the determined common modulation scheme at the transmitting side of the MIMO communication system; and transmitting all of the M transmission data streams via the M transmission antennas to a receiving side of the MIMO communication system, wherein each of the M data streams corresponds to each of the M transmission antennas, respectively.

4. A Multi-Input/Multi-Output (MIMO) communication apparatus having a plurality, of transmission antennas, comprising:

a receiving unit configured to receive a plurality of channel status information corresponding to a plurality of transmission data streams;

a determining unit configured to determine one of 1) a common modulation scheme, 2) a common coding scheme, or 3) a common modulation and coding set to use for all of the plurality of transmission data streams based on the plurality of channel status information, wherein the determining unit determines the common modulation scheme, coding scheme or modulation and coding set by calculating an average value of the plurality of channel status information, and selects the modulation scheme, coding scheme or the modulation and coding set that produces the calculated average value to use as the common modulation scheme, common coding scheme or common modulation and coding set;

a modulator configured to modulate all of the plurality of transmission data streams using the determined common modulation scheme;

a coding unit configured to code all of the plurality of transmission data streams using the determined common coding scheme; and a transmission unit configured to transmit all of the plurality of transmission data streams to a receiving side of the MIMO communication system.

* * * * *